United States Patent
Rye et al.

(10) Patent No.: US 6,744,463 B2
(45) Date of Patent: Jun. 1, 2004

(54) MULTI-CAMERA SURVEILLANCE AND MONITORING SYSTEM

(75) Inventors: David John Rye, New City, NY (US); Lesley Alan Leech, Kowloon (HK)

(73) Assignee: XIO, Ltd., Hamilton (BE)

( * ) Notice: Subject to any disclaimer, the term of this patent is extended or adjusted under 35 U.S.C. 154(b) by 0 days.

(21) Appl. No.: 09/539,986

(22) Filed: Mar. 30, 2000

(65) Prior Publication Data
US 2003/0038879 A1 Feb. 27, 2003

(51) Int. Cl.[7] .................................................. H04N 7/18
(52) U.S. Cl. ....................................................... 348/159
(58) Field of Search ................................ 348/143, 144, 348/148, 152, 153, 154, 169, 170, 211, 212, 723; 340/286.02; 364/550

(56) References Cited

U.S. PATENT DOCUMENTS

| | | | | |
|---|---|---|---|---|
| 5,111,288 A | * | 5/1992 | Blackshear | 358/108 |
| 5,526,133 A | * | 6/1996 | Paff | 358/335 |
| 5,583,796 A | * | 12/1996 | Reese | 364/550 |
| 5,689,261 A | * | 11/1997 | Mehta et al. | 341/173 |
| 5,786,746 A | * | 7/1998 | Lombardo et al. | 340/286.07 |
| 5,903,322 A | * | 5/1999 | Chen | 348/723 |
| 6,069,653 A | * | 5/2000 | Hudson | 348/143 |
| 6,097,429 A | * | 8/2000 | Seeley et al. | 348/154 |
| 6,122,005 A | * | 9/2000 | Sasaki et al. | 348/211 |
| 6,191,814 B1 | * | 2/2001 | Elberbaum | 348/212 |
| 6,208,376 B1 | * | 3/2001 | Tanaka et al. | 348/153 |
| 6,229,433 B1 | * | 5/2001 | Rye et al. | 340/310.01 |
| 6,233,428 B1 | * | 5/2001 | Fryer | 434/308 |
| 6,239,836 B1 | * | 5/2001 | Suzuki et al. | 348/211 |
| 2001/0033332 A1 | * | 10/2001 | Kato et al. | 348/211 |

* cited by examiner

Primary Examiner—Chris Kelley
Assistant Examiner—Tung Vo
(74) Attorney, Agent, or Firm—Marvin N. Gordon

(57) ABSTRACT

A multi-location and multi-camera surveillance system includes cameras located at different locations. The cameras are selectively turned on and off by addressable control modules operatively connected to the cameras and a transceiver connected operatively to the modules, which turn off a previously on camera before turning another camera on, thereby to prevent more than one of the cameras from being on at any given time. The on-off actuation of the cameras may be achieved in a sequential fashion.

12 Claims, 1 Drawing Sheet

MULTI-CAMERA SURVEILLANCE AND MONITORING SYSTEM

BACKGROUND OF THE INVENTION

Field of Invention

The present invention relates generally to surveillance systems, and more particularly to a system for monitoring a plurality of different, spaced locations in a home at a single viewing station.

The use of video cameras, particularly to monitor the activities and comings and goings of individuals at various locations in a public building, has become widespread in recent years as security concerns have increased. To this end, video cameras are positioned at various locations in the building. The video outputs of the cameras coupled respectively to a corresponding plurality of television receivers located at a security station at which the images from these cameras can be viewed by a security officer who is thus able to view each of the monitored locations at one time.

Although less common, largely as a result of cost, the use of video cameras to monitor locations in and outside of a residence is also on the increase, as both the cost and size of television monitoring equipment have decreased while home security concerns have increased. For example, by the use of a properly located video camera connected to a wireless transmitter that sends a video signal to a receiver connected to a television monitor, the homeowner is able to see from a safe distance who is at the front door, view the pool, check on the baby in a crib, and the like.

To increase the utility of the use of video cameras to monitor different locations in the home, it is desirable to be able to view on a single receiver or monitor the images derived from a plurality of video cameras located at the selected different locations that are of primary concern to the homeowner. This arrangement, however, requires that the video transmitter associated with the video camera that is then on be turned off before the video transmitter associated with another video camera directed at the desired new monitoring location is turned on. Otherwise the television monitor or receiver would receive images from two or more different video transmitters at the same time, which would result in an unusable, garbled image. There is thus a need for an improved, reliable and yet reasonably priced multi-location home surveillance system that employs a plurality of spaced, remote video cameras each with its own video transmitter that transmits a video image to a central receiver.

SUMMARY OF THE INVENTION

It is accordingly an object of the present invention to provide a multi-camera home surveillance and monitoring system in which only one of the multiple cameras in the system is able to send an image at any given time to a central receiver.

It is a further object of the present invention to provide a home surveillance system of the type described that reliably achieves viewing of any selected one of a plurality of spaced locations in and around the home at a single viewing station.

It is another object of the present invention to provide a home monitoring system of the type described in which spaced locations in and around the home may be automatically and sequentially monitored.

To these ends, the home surveillance system of the present invention includes a plurality, for example four, of video cameras and associated video transmitters or senders positioned at selected different locations in and around the home. Each of the cameras is selectively operable, i.e., turned on and off, by the operation of a remote control unit, which sends a control "off" signal to the previously "on" camera just prior to sending an "on" signal to the newly selected camera. In this manner, only one of the cameras is "on" at any given time, thus assuring that two or more cameras do not transmit their video images at the same time.

For example, in one embodiment of the invention described herein, a control signal is sent to turn television camera 1 "on" by an addressable control module to which the camera and its associated video transmitter are connected. Then a control signal is sent to turn another camera, say camera 2, "on" by an addressable control module to which that camera and its associated video transmitter are connected. The addressable control module to which the camera and its associated video transmitter set to "1" are connected automatically turns off when the addressable control module to which the camera and its associated video transmitter set to "2" turns on. The camera control signals are preferably in the form of binary-coded signals received by the control modules from a "smart" transceiver via a common connection to the home a.c. power line in a manner similar to that described in U.S. Pat. No. 6,229,443. These coded signals would typically include the address and desired control function, i.e., turn "on" and turn "off", of the control modules.

The transceiver operates in response to rf. binary-coded signals received from a remote control unit to receive, detect and convert those signals to correspondingly binary-coded signals, which, as stated above, are transmitted to the control modules over the a.c. power line. In another aspect of the invention, the remote control unit may include a scan function in which it transmits a scan code signal to the transceiver, which, in one embodiment of the invention, in response, transmits sequential control signals to the control modules and thus to the video transmitters or senders to cause the latter to be turned on and off in a predetermined sequence, e.g., backward or forward, with, as noted above, only one of the cameras being turned "on" at any given time.

In the scan mode, upon the receipt of a scan code signal from the remote control unit, the transceiver sends over the a.c. power line an initial control signal, which turns a previously "on" camera, say camera 1, "off", and after a predetermined period sends a second control signal, which turns camera 2 "on". After a further preset delay, the transceiver sends a new control signal to turn camera 2 "off" and a further signal to turn camera 3 "on". This process continues as long as desired so that the home owner can continuously, automatically monitor each viewed location in and around the home in either a forward, camera 1-2-3-4 sequence, or a backward or reverse, camera 4-3-2-1 sequence.

In another implementation of the invention, each of the plurality of addressable control modules includes a resident code, in addition to its own unique address code, that designates the module as being included in a common group of modules. In this arrangement, the control command signal that is sent by the transceiver to each of the modules includes the group code in addition to the designated module address and camera command code. In response to this coded signal, the module that is addressed and which is to be actuated is turned on and each of the other modules in the group is turned off.

BRIEF DESCRIPTION OF THE DRAWINGS

To the accomplishment of the above and such other objects as may hereinafter appear, the present invention is directed to a multi-location television surveillance and monitoring system, substantially as defined in the appended claims and as disclosed in the following detailed specification as considered together with the accompanying drawing, in which the single figure

DETAILED DESCRIPTION OF THE PREFERRED EMBODIMENT

Figure 1:
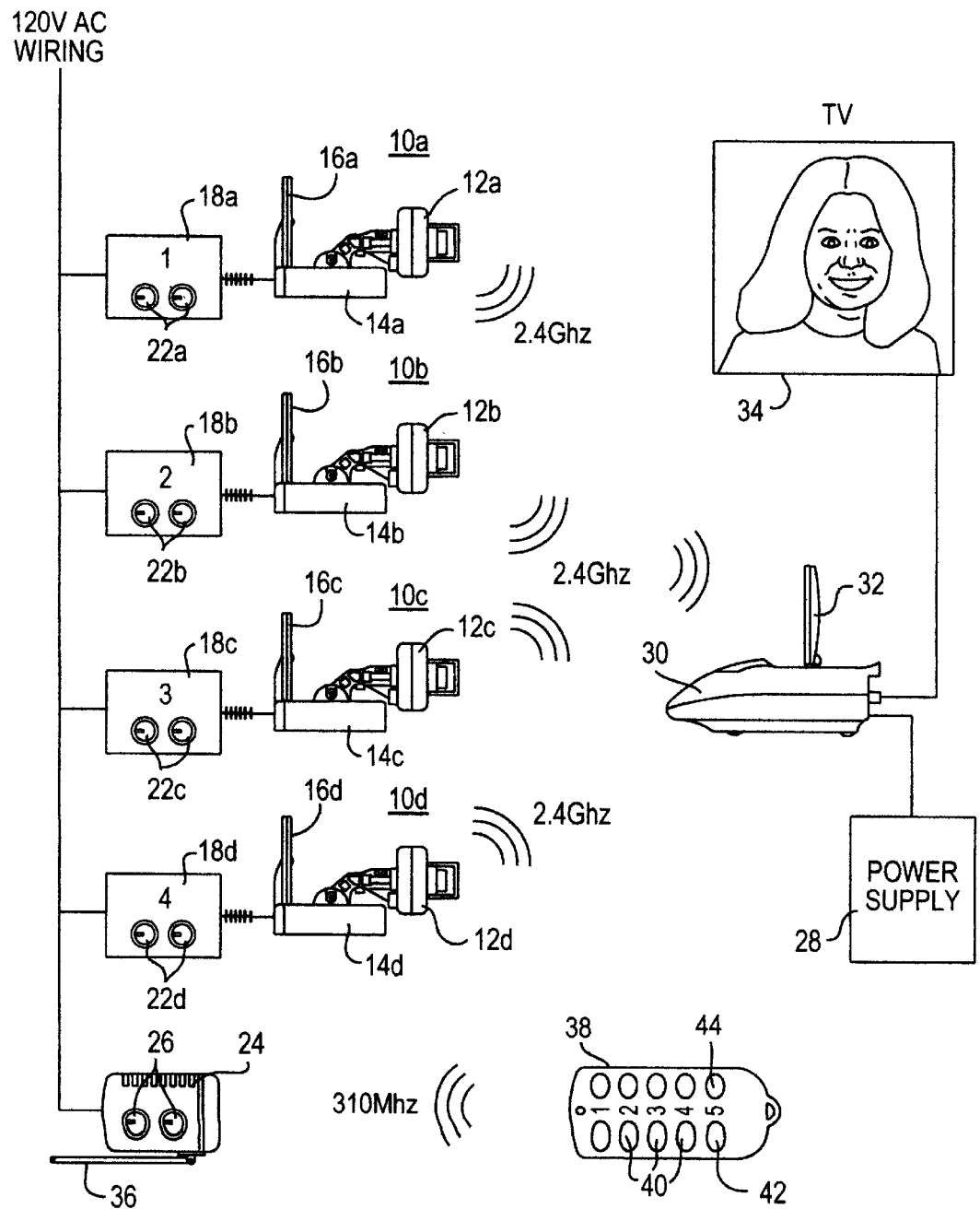
FIG. 1 is a schematic diagram illustrating a multi-location surveillance system in accordance with an embodiment of the invention.

As shown in FIG. 1, a plurality of video camera units 10a–10d, here shown for purposes of example only as being four in number, are located at various selected, spaced locations in and around a home or the like. For a home installation, one camera unit could be situated, for example, in a baby's room and another by a pool. Since camera units 10a–10d are essentially identical in their arrangement and operation, only one of those units is hereinbelow described in detail, it being understood that that description applies equally to all of the camera units.

Thus, camera unit 10a includes a video camera 12a, which is preferably a miniaturized color camera that can be manually moved through an arcuate path to allow it to scan a relatively large area. The video signal developed by camera 12a is applied to a wireless video sender or video transmitter 14a to which is also connected a patch antenna 16a. The camera 12a is preferably plugged into wireless video sender 14a, which transmits a video signal from its integral patch antenna 16a at a frequency in the r.f. range, such as 2.4 GHZ, to the wireless video sender 14a, which receives this signal via its patch antenna. Video sender 14a may, as shown, receive its operating voltage, here shown as 12 volts dc, from an addressable control module 18a, which is connected to the house ac power line 20. The control module 18a to this end includes a controllable or switchable internal power supply (not shown in the figure) that converts the 120 volt ac on line 20 to 12 volts dc. Control module 18a also may include manually controllable dials 22 to perform manually controlled appliance address and control operations such as those described in said copending application.

Also connected to ac power line 20 is a "smart" transceiver 24, which may, as shown, include manual control dials 26. A 12 volt dc power supply 28 converts the 120 volt ac on line 20 to 12 volts dc, which is applied to a 2.4 GHz video receiver 30. An antenna 32 connected to the video receiver 30 is arranged to receive 310 MHz coded rf. signals from a remote control unit 38 described in greater detail below. The output of video receiver 30 is applied to the video input of a conventional television receiver 34 to which it may be physically mounted. Transceiver 24 further includes an antenna 36, which receives rf. binary-coded control signals from the remote control unit 38, which, as described below, controls the operation of the control modules 18 and thus the operation of the video camera units 10a–10d.

In the operation of the multi-location surveillance system illustrated in FIG. 1, the user selects which location he/she wishes to monitor by selectively causing one and only one of the camera units 10a–10d to be actuated at one time, thereby to transmit a signal that can be viewed on receiver 34. To this end, the user presses one of the camera select buttons 40 numbered 1 to 4 on the remote control unit 38, which, in response, transmits binary-coded r.f. signals reflecting the user's camera selection at an exemplary frequency of 310 MHz. Those signals are received by antenna 36 of transceiver 24 at which these rf coded signals are detected and then transmitted over the ac power line 20 to the control modules 18. As described in greater detail in said co-pending application, the contents of which are herein incorporated by reference, those coded signals are decoded in the control modules, thereby to select, to wit, address, one of the addressable control modules 18 and determine the control function, e.g., turn the camera unit, to which that addressed control module is connected, on or off.

In accordance with the present invention, the binary coded camera select signal that is transmitted by the remote control unit to the transceiver actuates or turns on the selected one of the camera units and also sends a signal just prior, e. g., one second, to the control signal that turns "off" the previously actuated or "on" camera unit. That is, the binary coded rf signal transmitted by the remote control unit 38 that is, for example, intended to turn camera unit 10b or camera 2 "on", also includes binary coded signals that contain the address for the control module associated with the previously "on" camera, say camera unit 10a or camera 2, and a binary coded control signal to turn camera 2 "off".

The binary codes for the camera or control module addresses and control signals are preferably stored in a memory contained in the remote control unit 38, which may also include an rf. transmitter and a modulator for modulating the 310 MHz r.f. carrier with the binary address and control signals as selected by the user. Since the design of the memory and rf portions of the remote control unit are within the skill of the average designer of such units, no further description of that portion of the remote control unit is given herein. The transceiver 24, as noted, includes circuitry for detecting and decoding the binary coded r.f. signals it receives from the remote control unit. That transceiver circuitry is also not further described herein since its design is also believed to be well within the skill of the average designer.

In summary, if camera unit 10a is "on" and the user wishes to view or monitor the location covered by camera unit 10b, the operation of control modules 18 in response to the signals they respectively receive from transceiver 24 will cause camera unit 10a to be turned off and shortly thereafter will cause camera unit 10b to be turned on. In this manner the image produced by only one of the camera units, here camera unit 10b, will be viewed at receiver 34 at that time as desired.

Alternatively, remote control unit 38 may transmit binary coded signals that cause the sequential on-off operation of camera units 10a–10d. Thus, for example, the address and control signals applied to the control modules 18 by transceiver 24 may turn previously "on" camera unit 10a "off" and then shortly thereafter turn camera unit 10b "on"; thereafter, following a short period, e.g. 5 seconds, camera unit 10b is turned "off" and then camera unit 10c is turned "on". This process continues automatically as long as desired, so that each of the camera units is turned "on" for a specified time, after which, following a predetermined delay, it is automatically turned "off" and the next camera unit is turned "on". The remote control unit includes keys or buttons 42 and 44 whose operation cause the sequence of camera unit scanning to occur in either a forward sequence, i.e., camera units a-b-c-d, or a reverse sequence of camera units d-c-b-a. In this manner, the user is able to sequentially and automatically monitor a plurality of different locations.

In one embodiment of the invention, the scan procedure may be controlled completely by logic circuitry contained in the remote control unit. In this embodiment when the user presses the scan forward button 42 on the remote control unit 38, the latter, in response, transmits a unique binary coded rf forward scan command signals, based on codes stored in its memory, to the transceiver 24, which passes those signals onto the a.c. power line 20 from which they are applied to the control modules 18. Thus, for example, the coded signal transmitted by the remote control unit 38 may include coded commands to turn camera 1 "on", followed, say five seconds later, by a command signal to turn camera 1 "off", followed by a command to turn camera 2 "on" followed by a command signal to turn camera 2 "off", followed at a preset rate of say every five seconds, by command signals to turn camera 3 "on" and then "off, followed by command signals to turn camera 4 "on" and then "off, followed by a return of the commands to turn camera 1 "on" and then "off". The scanning procedure continues in this sequence until it is terminated by a subsequent operation of the scan forward button 42 on the remote control unit. If desired, the camera scan sequence may be carried out in a reverse order of cameras 4-3-2-1 by the pressing of a scan back button 44 on the remote control unit. In an alternative version of the scan operation, the operation of scan forward button 42 on the remote control unit 38 causes unit 38 to transmit a unique scan forward code that is recognized in the transceiver 24 as a scan forward command. Upon the receipt of this coded command, the transceiver then transmits the scan command codes of the nature described above from its memory onto the ac power line 20 from which they are passed to the control modules 18 that control the cameras 12, as described above.

In a further embodiment of the invention, each of the modules 10a–10d has stored in its resident memory a common group code that identifies the modules as being included in a designated group of modules. In this arrangement, the control signal that is applied to the modules 10a–10d includes the group code as well as the address of the selected individual module, for example, module 10a in this example, and camera control or "on" signal. In response, module 10a will be actuated to turn its associated camera, and all other modules in the group, in this example, modules 10b–10d, will turn off. If the group code sent to the modules is not the group code, such as one for a second group of modules, all of the four modules 10a–10d will ignore the signal Thus, for example, if the control signal sent to the group of addressable modules in FIG. 1 includes the group code and a command to turn camera 1 on, that is turn module 10a on, that module turns on and modules 10b–10d, along with cameras 2, 3, and 4, turn off. Similarly if the group command signal is to turn camera 2 on, module 10b turns on and the other modules in the common group, namely modules 10a, 10c and 10d, and their associated cameras are turned off.

It will be appreciated that the multi-location surveillance and monitoring system of the present invention allows an individual to effectively monitor a plurality of spaced locations in and around the home at a single television receiver. It will also be appreciated that although the invention has been described with respect to only a single, presently preferred embodiment, modifications may be made therein without necessarily departing from the spirit and scope of the invention.

What is claimed is:

1. A multi-location video surveillance system comprising a plurality of video cameras adapted to be located at a corresponding plurality of locations, a plurality of video means respectively operatively connected to said plurality of cameras for respectively receiving video signals from said cameras and for respectively transmitting video signals respectively derived from said cameras to a remote television receiver, a plurality of control means respectively operatively connected to said plurality of video means and adapted to be operatively connected to a common ac power line, transceiver means operatively connected to said control means for transmitting a binary-coded control and select signal to said control means along said ac power line, each of said control means including an addressable control module having a unique address, said control means being effective in response to a received binary coded control and select signal that includes the address of the control means operatively connected to the one of said cameras that is then on to automatically turn off said on one of said cameras, said control and select signal further including the address of another previously off one of said cameras to turn on said previously off one of said cameras a predetermined time after said previously on one of said cameras is turned off, whereby only one of said cameras is on at any given time.

2. The system of claim 1, in which said plurality of video means comprises a plurality of video senders respectively operatively connected to said plurality of cameras, each of said video senders including a control input respectively operatively connected to one of said plurality of control means.

3. The system of claim 1, in which said remote control unit includes means for transmitting a scan control signal to said transceiver, whereby, in response thereto, said plurality of television cameras are turned on and off in a predetermined sequence.

4. The system of claim 3, in which said control signal is effective to turn on a selected previously off one of said cameras a predetermined time after it turns off a previously on other of said cameras.

5. The system of claim 1, in which said transceiver means includes means for detecting the addresses of the ones of said control modules operatively connected to the ones of said cameras that are to be turned off and then on.

6. The system of claim 1, in which a number of said control modules each include a common group code, said control signal also including a group-identifying code portion, whereby, in response to said code, one of said modules in the group is turned on and the other modules in the group are all turned off.

7. The system of claim 1, wherein the transmission frequency of said video means is 2.4 GHz.

8. The system of claim 1, in which said control signal is effective to turn said plurality of cameras on and off in a predetermined sequence.

9. The system of claim 8, in which said control signal is effective to turn on a selected previously off one of said cameras a predetermined time after it turns off a previously on other of said cameras.

10. The system of claim 1, wherein said control means in response to said control and select signal is effective to turn said cameras on and off in a predetermined sequence.

11. The system of claim 1, in which said control means further comprises an addressable transceiver operatively connected to said plurality of control modules and a remote control unit for transmitting binary-coded address and function signals to said transceiver.

12. The system of claim 11, in which said remote control unit transmits said binary-coded signals at a frequency of 310 MHz.

* * * * *